April 9, 1940. G. MUSAPHIA 2,196,423

MEANS FOR AND METHOD OF CREATING MOTION EFFECTS

Filed Dec. 18, 1936

INVENTOR.
Georges Musaphia
BY
ATTORNEY.

Patented Apr. 9, 1940

2,196,423

UNITED STATES PATENT OFFICE 2,196,423

MEANS FOR AND METHOD OF CREATING MOTION EFFECTS

Georges Musaphia, Los Angeles, Calif.

Application December 18, 1936, Serial No. 116,519

17 Claims. (Cl. 40—132)

The present invention relates to and has for object the provision of a means and a method comprising the use of a fluorescent figure or an object coated with fluorescent material, together with a source of light of given wave length, such as ultra-violet emanations, arranged and manipulated whereby the object or figure will fluoresce and create the illusion of motion thereof.

An important object of the invention is to provide an apparatus wherein a translucent screen arranged in front of a translucent figure or object which is fluorescent will brilliantly reveal said object or figure as in motion and in color for display purposes, or for making motion pictures, when light rays of a given wave length emanating from a source of light are directed onto said object or figure.

A further important object is to provide an apparatus of the character described wherein the translucent and fluorescent treated figure or object is mounted on a translucent carrier arranged to be moved in a predetermined manner whereby to create the illusion of motion of the object in sharply displayed colors of the fluorescent material on a translucent screen placed in front of said carrier.

A further object is to provide an apparatus of the character described wherein the fluorescent object or figure may have portions in different and adjacent planes, such, for example, as the feet and head of a horse offset from the plane of the body of the horse, the said body being affixed to the carrier therefor whereby to emphasize the animated effect appearing on the screen, the said carrier being subject to continuous motion in a predetermined manner whereby the bodily or otherwise movement of the figure or object, together with the varying angle of projection of the light rays will combine to produce a pronounced illusion of movement.

I have shown in the accompanying drawing a preferred form of means for and method of creating motion effects embodying my invention, subject, however, to modification, within the scope of the appended claims, without departing from the spirit of my invention.

Referring to the drawing.

Figure 1:
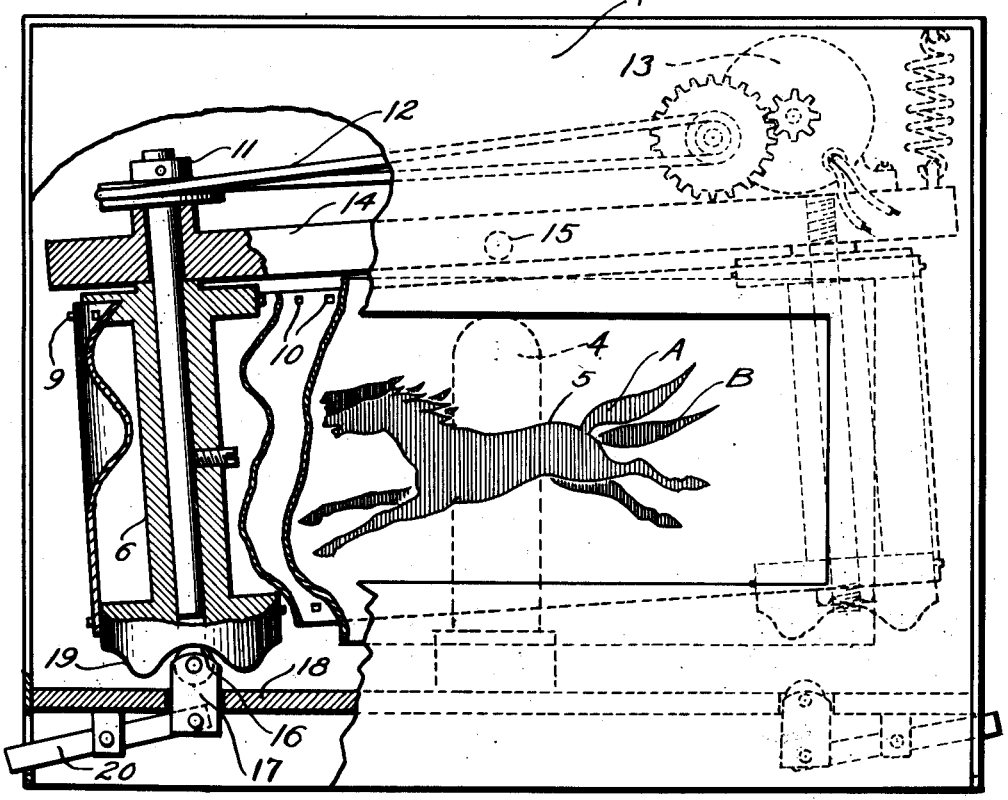
Fig. 1 represents a front elevation of an apparatus with which the method of this invention may be carried out, showing a portion thereof broken away and in section, for the purpose of clarity of illustration.
Figure 2:
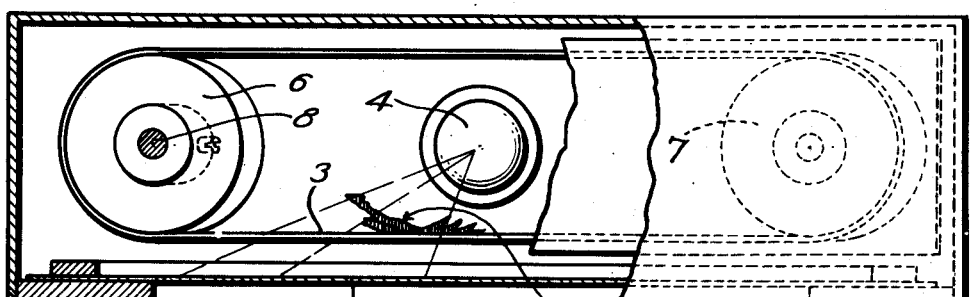
Fig. 2 represents a top plan view of the apparatus being broken away and shown partly in section.
Figure 3:
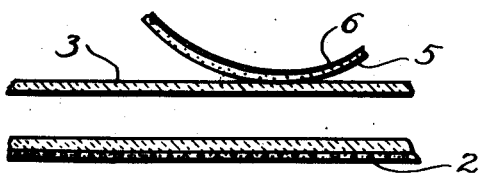
Fig. 3 represents a fragmentary, horizontal, sectional view taken through the screen, translucent carrier, and object or figure on the carrier.

One form of apparatus with which this invention may be carried out effectively consists primarily, as shown in detail in the accompanying drawing, of a casing 1 provided in the front wall with a translucent screen 2 and containing interiorly thereof an endless, translucent or transparent carrier 3, which operates about a source of light 4 of a desired wave length, such as an ultra-violet lamp or a lamp which will emanate rays effective when placed behind the front run of the carrier for exciting the fluorescent areas. Mounted on the inner face of the carrier is a transparent or translucent object or figure 5 provided with a coating of fluorescent material 6. As here shown, the object or figure 5 is cemented or otherwise affixed to the carrier and has portions thereof disposed out of the plane of the secured portion or extended rearwardly therefrom. In other words, the object or figure is partially mounted in relief. This figure may, as here shown, comprise the representation of a horse, or any other suitable object, as desired, and is preferably represented in color by the fluorescent coating 6. Ordinarily, this figure would not be visible through the screen 2, particularly as to the colors thereof, but when the fluorescent coating 6 is excited by the given wave length rays emanating from the source 4, the figure or object is brilliantly displayed in color and clearly visible through the screen, it appearing, in fact, as though it were on the outer face of the screen.

By reason of the offset portions of design, the latter will simulate movement when displayed on the screen under the influence of the short or other given wave length rays, as aforesaid. This animated or movement effect will be enhanced by moving the figure, and this is accomplished by movement of the carrier 3.

As here shown, the carrier 3 is mounted upon rollers 6 and 7 fixed on adjustable spindles 8, said rollers having teeth 9 cooperating with apertures 10 in the carrier whereby, when the driving roller 6 is operated, the carrier will be rotated thereby. The spindle for the carrier 6 has a pulley 11 fixed thereto, and through a belt drive means 12 a suitable motor 13 will operate the roller 6 to move said carrier. As here shown, the spindles are journalled in a rocking support 14 pivoted as at 15 within the casing whereby the carrier may be moved bodily, or otherwise, as well as rotated in order to emphasize the illusion of motion of the object displayed on the screen. As here shown, I provide for an up and down or rocking movement of the light carrier while it is rotated around the rollers 6 and 7. This is accomplished by means of rollers 16 supported by vertically movable members 17, which are extensible through the bottom wall 18 of the casing into position to be engaged with the corrugated or otherwise shaped track portions 19 formed on the roller ends of the rollers 6 and 7. Each member 17 is mounted on a lever 20 operable to move the roller 16 thereon into and out of position of engagement with one of the tracks 19. With this arrangement, either one or both of the rollers 6 and 7 may be caused to move up and down, while the carrier is being rotated. Thus, a variety of movements may be given the carrier during the rotation thereof, and in the case of the object depicting a horse, it is seen that a galloping effect is readily obtainable, that the figure will actually move bodily while portions thereof, such as the tail, legs, head, by an offset as aforementioned, will create the illusion of motion in the ultimate display visible through the screen 2. It is important to note that by moving the fluorescent object or figure bodily while disposed rearwardly of a translucent screen, the said figure, being transparent or translucent, and while causing the given wave length rays to be projected onto said figure from the source 5 rearwardly thereof, there will be produced as visible through the screen and, in fact, in appearance as though on the screen, animated or motion effect of the figure in the exact colors of the fluorescent coating. This effect will be striking in its sharpness of outline and brilliance of color, due to the peculiar action of the fluorescent material under excitation of said short or other given wave length rays, and to the peculiar motion which may be given the object, and, further, due to the offsetting of portions of the object from the plane of the remainder thereof, and whereby the angles of projection of said rays will be constantly varied.

It is important to note that the motion and animated effects produced in accordance with this invention are not the result of shadows inasmuch as light rays as here used, will not produce such shadows, and, therefore, this apparatus and method can be readily distinguished from equipment such as heretofore used wherein ordinary light rays are projected onto an opaque or similar figure in order to form a shadow on the screen.

Fig. 1 shows a diagram of the display effect lined for colors, the diagram A in one color being the figure as it would appear at one moment and the diagram B of darker shading being the effect next given, due to movement of the light source or object whereby the angles of projection of the light rays will cause said effects as shown.

I claim:

1. The method of creating motion effects, which consists in presenting between a source of short wave length light rays emanating from ultra-violet light and a translucent screen a fluorescent translucent figure, and then moving said figure relative to said screen and light while maintaining the figure within the sphere of influence of said light rays.

2. The method of creating the illusion of motion, which consists in presenting between a translucent screen and a source of light rays emanating from an ultra-violet light a fluorescent translucent figure with portions disposed in different planes relative to the plane of the screen, and then moving said figure relative to said light while maintaining it within the range of influence of said light rays.

3. The method of producing animated effects, which consists in presenting between the observer and a source of ultra-violet light a translucent fluorescent figure, then moving said figure relative to said source while maintaining it within the sphere of influence of said light.

4. Apparatus for creating animated effects, comprising a translucent screen, a translucent carrier movable rearwardly of the screen, a translucent figure affixed on the rearmost face of said carrier and having a fluorescent coating, a source of ultra-violet light rearwardly of said figure, and means for moving said carrier to vary the position of said figure relative to said source of light.

5. Apparatus for creating animated effects, comprising a translucent screen, a translucent carrier movable rearwardly of the screen, a translucent figure affixed on the rearmost face of said carrier and having a fluorescent coating, a source of ultra-violet light rearwardly of said figure, and means for moving said carrier to vary the position of said figure relative to said source of light, said figure having portions thereof rearwardly offset.

6. Apparatus for creating animated effects, comprising a translucent screen, a translucent carrier movable rearwardly of the screen, a translucent figure affixed on the rearmost face of said carrier and having a fluorescent coating, a source of ultra-violet light rearwardly of said figure, means for moving said carrier to vary the position of said figure relative to said source of light, and means for effecting a rocking motion of said carrier while otherwise moved by the first named means.

7. Apparatus for creating animated effects, comprising a translucent screen, a translucent carrier movable rearwardly of the screen, a translucent figure affixed on the rearmost face of said carrier and having a fluorescent coating, a source of ultra-violet light rearwardly of said figure, means for moving said carrier to vary the position of said figure relative to said source of light, and means for effecting a different motion of said character while being moved by the first named means.

8. Apparatus for creating animated effects, comprising a cabinet, a translucent screen supported thereby, a translucent carrier movable rearwardly of the screen, a translucent figure fixed on the rear face of said carrier and having its rearmost face provided with a translucent coating, and portions thereof rearwardly offset from the remainder, a source of ultra-violet light arranged to direct rays therefrom onto said translucent coating, and means for moving said carrier and figure relative to said source of light.

9. Apparatus for creating animated effects, comprising a cabinet, a translucent screen supported thereby, a translucent carrier movable rearwardly of the screen, a translucent figure fixed on the rear face of said carrier and having its rearmost face provided with a translucent coating, and portions thereof rearwardly offset from the remainder. A source of ultra-violet light arranged to direct rays therefrom onto said translucent coating, means for moving said carrier and figure relative to said source of light, and an additional means for rocking said carrier during the aforesaid movement thereof.

10. The method of creating animated effects which consists in presenting a translucent object simulating an animate being within the range of light emanations of a given wave length which, when said object is treated with a substance adapted to react to said emanations, will fluoresce, and moving said object relative to the source of light and a screen, whereby said screen will portray the animated effect.

11. The method of creating animated effects which consists in presenting a translucent object simulating an animate being within the range of a light emanation which, when said object is treated with a substance adapted to react to light of a given wave length, will fluoresce, and moving said object relative to the source of light and a screen, whereby said screen will portray the animated effect.

12. The method of creating animated effects which consists in presenting portions of a translucent object in different planes between a source of light and a translucent screen and moving said object so as to simulate action significant of the thing said object represents to display an animated effect on said screen.

13. The method of creating animated effects which consists in presenting an inanimate translucent object treated with a substance adapted to react to light emanations between a source of light and a screen, and relatively moving said source of light and said object, for portraying an animated effect in color on said screen.

14. Apparatus for creating animated effects, comprising a translucent screen, a translucent carrier movable rearwardly of the screen, a translucent figure affixed on said carrier and having a fluorescent coating, a source of ultra-violet light, and means for moving said carrier to vary the position of said figure relative to said source of light.

15. Apparatus for creating animated effects comprising a translucent screen, a translucent carrier spaced from said screen, a translucent figure supported by said carrier and having a fluorescent coating, a source of light for directing light rays of given wave length onto and exciting said fluorescent coating and means for effecting relative movement between said carrier and said source of light.

16. Apparatus for creating animated effects including a light penetrable screen, a source of light rearwardly thereof, a light penetrable carrier spaced from and located between said source of light and said screen, a translucent figure on said carrier and having a portion thereof extended from the plane of the remainder thereof, and means for effecting relative movement of said carrier and said source of light for producing an animated image visible by means of said screen.

17. Apparatus for creating animated effects including a translucent screen, a source of light rearwardly thereof, a light penetrable carrier spaced from and disposed between said source of light and said screen, a translucent figure supported by said carrier and having a portion thereof extended from the plane of the remainder thereof, and means for effecting relative movement of the carrier and source of light for producing on the screen an animated image of the figure.

GEORGES MUSAPHIA.